(12) United States Patent
Ye et al.

(10) Patent No.: US 10,996,153 B2
(45) Date of Patent: May 4, 2021

(54) CORROSION-FATIGUE-COUPLED TEST METHOD AND DEVICE FOR STEEL BRIDGE DECK

(71) Applicant: Zhejiang University, Hangzhou (CN)

(72) Inventors: Xiaowei Ye, Hangzhou (CN); Zhiwen Chen, Hangzhou (CN); Xin Qian, Hangzhou (CN); Yuliang He, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/881,331

(22) Filed: May 22, 2020

(65) Prior Publication Data

US 2020/0386661 A1 Dec. 10, 2020

(30) Foreign Application Priority Data

Jun. 4, 2019 (CN) .......................... 201910482981.0

(51) Int. Cl.
*G01N 3/56* (2006.01)
*G01N 17/00* (2006.01)

(52) U.S. Cl.
CPC ............. *G01N 3/56* (2013.01); *G01N 17/006* (2013.01); *G01N 2203/0073* (2013.01); *G01N 2203/0641* (2013.01)

(58) Field of Classification Search
CPC ................... G01N 3/56; G01N 17/006; G01N 2203/0073; G01N 2203/0641
USPC ........................................................ 205/777
See application file for complete search history.

(56) References Cited

U.S. PATENT DOCUMENTS

| | | | | |
|---|---|---|---|---|
| 5,646,400 A | * | 7/1997 | Perez | G01N 21/774 250/226 |
| 6,257,064 B1 | * | 7/2001 | Duron | G01N 29/045 73/594 |
| 6,499,355 B1 | * | 12/2002 | Potyrailo | G01B 11/20 73/150 A |
| 10,783,406 B1 | * | 9/2020 | Ye | G06T 7/001 |
| 2004/0252748 A1 | * | 12/2004 | Gleitman | E21B 47/135 374/130 |
| 2009/0055106 A1 | * | 2/2009 | Finkel | G01B 17/04 702/39 |
| 2012/0096804 A1 | * | 4/2012 | Gutierrez Tenreiro | E01D 4/00 52/742.14 |

(Continued)

Primary Examiner — Max H Noori
(74) Attorney, Agent, or Firm — Wenderoth, Lind & Ponack, L.L.P.

(57) ABSTRACT

The present invention relates to a corrosion-fatigue-coupled test method and device for a steel bridge deck. The method includes: 1) installing an orthotropic steel bridge deck (OSBD) and pasting filter paper; 2) installing a sodium chloride solution delivery pipe; 3) installing an infrared (IR) lamp; 4) preparing a corrosive solution; 5) coupling corrosion and fatigue; and 6) acquiring test data. A device constructed by using the method includes a to-be-tested OSBD, a support device, a pressure pump, a water tank, a monitoring device, an IR lamp, a plastic water pipe, a thermostat and a rotary sprayer. The present invention solves the problem of laboratory accelerated corrosion of the OSBD. The present invention fully considers a coupling effect of a corrosive medium and an alternating stress, so that the created simulation environment is close to a service environment of the OSBD, and the test data are effective and reliable.

2 Claims, 2 Drawing Sheets

(56) References Cited

U.S. PATENT DOCUMENTS

2015/0226633 A1* 8/2015 Greimann ........... G01M 5/0033
  73/786
2016/0265339 A1* 9/2016 Xia ........................ H01B 7/046
2019/0360943 A1* 11/2019 Sahu ...................... G01N 21/90

* cited by examiner

CORROSION-FATIGUE-COUPLED TEST METHOD AND DEVICE FOR STEEL BRIDGE DECK

TECHNICAL FIELD

The present invention relates to a corrosion-fatigue-coupled test method and device for a steel bridge deck.

BACKGROUND

In the welded structure of the orthotropic steel bridge deck (OSBD), the steel bridge deck and the longitudinal stiffeners and diaphragms are connected by a large number of welded seams, which makes the welded structure complicated. As the geometrical dimensions of the weld toe of the welded structure are discontinuous, the stress changes in the vicinity are large, causing stress concentration at the weld toe. Under the direct action of the traffic load, the weld seams at the weld joints of the OSBD are prone to structural damage. The corrosion and fatigue-induced failures of the OSBD are fatigue fractures caused due to the coupling effect of the alternating stress and corrosive medium. The corrosion and fatigue degradation mechanism of the OSBD is as follows:

1. Deterioration of OSBD caused by chloride ions. In the welded structure of the OSBD, the steel bridge deck and the longitudinal stiffeners and diaphragms are connected by a large number of weld seams. Due to welding defects, the chloride ions on the surface of the weld seam penetrate into the weld seam and spread around. When the chloride ions accumulate to a certain concentration, the passivation film is partially destroyed. An anode is formed where the passivation film is damaged, and a cathode is formed where it is not damaged, thereby producing a corrosion cell to cause corrosion of the OSBD. The anode metal iron is oxidized to yield iron ions, which react with hydroxide to form ferrous hydroxide. The ferrous hydroxide encounters water and oxygen in the pore fluid to convert into other forms of rust. Chloride ions act as a catalyst in the corrosion of steel. As the steel corrosion develops, pitting occurs in the weld seam and spreads around to form pits.

2. Coupling effect of chloride ions and fatigue load on the deterioration of OSBD. Under the action of the alternating stress, as the corrosion intensifies, pits are easily formed near the weld toe, further causing stress concentration. It is generally believed that the fatigue cracks of the OSBD originate from the pits. When the depth of a pit reaches a critical value, the pit begins to transform into a crack. The period from the pit to the crack is related to the corrosion environment and the frequency of fatigue load and stress amplitude. The corrosion and fatigue fracture mechanism is divided into seven stages: pitting nucleation, pitting propagation, pits into short cracks, short crack propagation, short cracks into long cracks, long crack propagation and failure. Compared with the monotonic load, the stress at which the alternating load (or strain) causes cracking is small, and the alternating hardening or softening occurs after the limit is reached. When there are nicks and inclusions, the cracks are generated on the top of the defects, and when no such defects are present, the cracks are generated on the surface.

3. Effect of fatigue load on the deterioration of OSBD. Under the action of the fatigue load, the cracks further develop until their length reaches a critical value. At this time, the structure reaches the ultimate bearing capacity, and the OSBD fails.

In fact, for cross-river and cross-sea structures, the OSBD is usually subjected to the coupling effect of cyclic loads and corrosive media. The performance degradation of the OSBD under the coupling effect of corrosion and fatigue is more significant than that caused by a single factor (corrosion or fatigue), which causes a significant reduction in the service life of the bridge. It is necessary to carry out structural performance tests on the OSBD under the coupling effect of corrosion and fatigue and record the stress performance, corrosion law and crack propagation of the OSBD in real time during the test. This has important guiding significance for grasping the deterioration mechanism of the OSBD under the coupling effect of corrosion and fatigue and establishing an accurate theory of time-varying evaluation for structural properties.

At present, the laboratory accelerated corrosion methods mainly include:

1. Immersion corrosion test. Immersion corrosion test is a simple and widely used accelerated corrosion test. A corrosive solution prepared or taken from the site is used to immerse the specimen for a period of time, and the specimen is evaluated by surface inspection, mass measurement and pitting measurement.

2. Salt spray test. Salt spray test is an accelerated corrosion test performed in a corrosion chamber. There are three types of salt spray tests according to different salt solutions: neutral salt spray (NSS) test, acetic acid salt spray (ASS) test and copper accelerated acetic acid salt spray (CASS) test. These methods are used to compare different types of corrosion resistance. However, because the factors considered in the salt spray test are simple, it is difficult to accurately simulate the outdoor atmospheric environment.

3. Damp heat corrosion test. Damp heat corrosion test is an accelerated corrosion test for simulating the atmospheric environment in a hot and humid area. The damp heat corrosion test is divided into continuous damp heat test and intermittent damp heat test according to the hot and humid environment. They are used to evaluate the corrosion resistance of metals, but they have a long test period.

4. Corrodkote (CORR) test. CORR test is an accelerated corrosion test in which a corrodkote mud is evenly applied to the corrosion specimen. The CORR test has the advantages of good reproducibility, fast corrosion rate, and good correlation with outdoor atmospheric tests. It is mainly used to detect the corrosion of coated steel.

5. Alternate immersion corrosion test. Alternate immersion corrosion test is an accelerated corrosion test in which the specimen is alternately immersed and dried. It can well simulate the exposure of steel to the sun and rain in the real atmospheric environment, and can also use electrochemical measurements.

At present, the structural performance test device of OSBD usually only considers the effect of a single factor (fatigue), and almost no device considers the coupling effect of corrosion and fatigue.

The present invention provides a corrosion and fatigue test device for the OSBD, which overcomes the deficiencies of the prior art. The present invention proposes an innovative design concept of alternating dry-wet accelerated corrosion based on the existing alternate immersion corrosion test.

SUMMARY

The present invention proposes a corrosion-fatigue-coupled test method and device for a steel bridge deck. The present invention fully considers a coupling effect of corrosion and fatigue and well simulates the corrosion of steel in a real atmospheric environment. The present invention solves the problem of inaccurate results caused by the current structural performance test device of orthotropic steel bridge decks (OSBD) which considers only the effect of a single factor without considering the coupling effect of corrosion and fatigue.

A corrosion-fatigue-coupled test method for a steel bridge deck includes the following steps:

1) installing a full-scale model of a segmented orthotropic steel bridge deck (OSBD) in a fatigue laboratory, arranging a fiber Bragg grating (FBG) sensor, and pasting filter paper: shipping the OSBD to the laboratory after the manufacture of the OSBD in a factory, and fixing the OSBD by a simple support; then arranging an FBG chloride ion concentration sensor at an equal distance of 2 mm within 30 cm of a weld seam to monitor the corrosion of the OSBD near the weld seam; determining a stress monitoring position by using a hot spot stress (HSS) extrapolation method, and arranging an FBG stress sensor and an FBG temperature sensor; applying an epoxy resin to prevent the sensor from being corroded; pasting the filter paper in the range of the weld seam and the FBG stress sensor and the FBG temperature sensor, so that a uniform water film is formed on the OSBD during an accelerated corrosion process, which is close to an actual corrosion situation;

2) establishing a time-varying relationship of a corrosion-fatigue-coupled process: coupling an alternating stress with a corrosion environment (which is close to an actual situation) to study a corrosion-fatigue life of the OSBD, wherein the corrosion and fatigue are coupled as follows: a: establishing an equation $\log P_{outside} = \log P_{inside}$ according to a power function followed by the atmospheric exposure of Q345 steel, that is, $\log P = A + B\log T$; b: taking $A_{inside}$ and $B_{inside}$ derived from a laboratory test and $A_{outside}$ and $B_{outside}$ derived from an atmospheric exposure test into the established equation to calculate a corrosion acceleration ratio; and c. controlling a laboratory accelerated corrosion multiple to equal a laboratory fatigue loading multiple by controlling a fatigue loading frequency, after obtaining the laboratory corrosion acceleration ratio;

3) installing a sprayer corrosion device: preparing a 3.5% sodium chloride solution in a water tank connected to a pressure pump through a pipe; then installing a pipe support, which is 5 cm away from a normal of the weld seam of the OSBD and 12 cm away below a center of the weld seam; welding a steel plate to a lower part of the pipe support, and fixing the steel plate on the ground with a connecting bolt; connecting a delivery pipe to the other end of the pressure pump, the delivery pipe being a polypropylene random (PPR) pipe with an outer diameter of 20 mm; making a small hole every 18 cm on a pipe parallel to a U-rib and a hole (corresponding to a center of the U-rib) on a pipe perpendicular to the U-rib to install a sprayer; connecting the installed sodium chloride solution delivery pipe to the pressure pump; installing an infrared (IR) lamp on a steel pipe on the top of the pipe support, and connecting the IR lamp to a thermostat, so as to simulate actual sunlight to increase the temperature of the corrosion environment and accelerate the corrosion of the OSBD; protecting the IR lamp with a transparent protective cover to avoid an influence of the corrosive solution;

4) designing a corrosion-fatigue-coupled test of the full-scale model of the segmented OSBD: performing alternating dry-wet immersion accelerated corrosion with 3.5% sodium chloride solution in the water tank; calculating the volume of corrosion yielded by the laboratory accelerated corrosion for 24 h, which is equivalent to the volume of corrosion caused by the outdoor atmospheric exposure for 56 d; coupling the corrosion and fatigue according to the loading frequency; setting an alternating dry-wet cycle to 1 h of spraying and 3 h of drying, through a corrosion-fatigue-coupled calculation; using the IR lamp to control the temperature to 35° C. for spraying and 40° C. for drying; determining the fatigue loading frequency to be 3 HZ, and conducting a static load test before fatigue loading to confirm that all components are normal; performing corrosion and fatigue loading simultaneously to achieve a coupling effect of corrosion and fatigue according to the determined corrosion time and loading frequency; and 5) acquiring data of the corrosion-fatigue-coupled test of the full-scale model of the segmented OSBD: starting the corrosion test and the fatigue loading test of the full-scale model of the segmented OSBD simultaneously according to the designed corrosion-fatigue-coupled test; recording the number of stress cycles when a specimen is destroyed, and acquiring and storing the data of the sensor.

The present invention further provides a device for implementing the above corrosion-fatigue-coupled test method for a steel bridge deck, comprising a hydraulic jack 34, a test loading beam 35, a rubber support 20, a delivery pipe support 13, a first pipe 3, an IR lamp 24, a water tank 1 and a pressure pump 6, wherein the hydraulic jack 34 acts on the test loading beam 35; a rubber support 20 with an area of 200 mm×300 mm is placed between the test loading beam 35 and a test model to simulate a load of a single tire wheel transmitted through a paving; the delivery pipe support 13 is fixed on the ground parallel to a weld seam of the bridge model by a connecting bolt 16; the first pipe 3 is provided with a sprayer 25 and fixed to the delivery pipe support 13 by a clamp; a wood board 23 is bound on the delivery pipe support 13 below the first pipe 3; the wood board 23 is provided thereon with the IR lamp 24; a water tank 1 holding 3.5% sodium chloride solution 2 is placed in a lower right corner of the bridge deck model; the water tank 1 is connected to the pressure pump 6 through a second pipe 37; the right of the pressure pump 6 is divided into two third pipes 38 through a tee, which are connected to a joint 32 and a joint 33, respectively;

an OSBD is made of special Q345qD steel, and welded by a bridge deck, a diaphragm and a U-rib; in the OSBD, a cover plate 19 is 14 mm thick, a lower flange 18 is 12 mm thick, the diaphragm 31 is 10 mm thick, the size of the U-rib 21 is 300 mm×280 mm×8 mm, and a center distance of the U-rib 21 is 600 mm; the bridge deck is fixedly installed in a fatigue laboratory by simple supports 14,15 of the OSBD; an FBG stress sensor 26 is arranged at an equal distance of 2 mm within 30 cm on both sides of the weld seam; the FBG stress sensor 26 is arranged at 5.6 mm, 14 mm and 20 mm from a weld toe at a welding position between the bridge deck and the U-rib by using a HSS extrapolation method; the FBG stress sensor 26 is arranged at 5 mm, 15 mm and 20 mm from a weld toe at a welding position between the bridge deck and the diaphragm; an FBG temperature sensor is connected in series with the FBG stress sensor for temperature compensation; the FBG stress sensor 26 is connected to a data acquisition and storage device 30 through a conductive fiber 36 and a demodulator.

The present invention has the following advantages. 1) This test device simulates the coupling effect of a corrosive medium and an alternating stress in an actual environment, which is close to an OSBD service environment, so that the test data are effective and reliable.

2) The test procedure of this test device is close to a theoretical model of a corrosion and fatigue induced failure of the OSBD, and provides test reference for grasping the corrosion and fatigue mechanism of the OSBD and performing theoretical analysis.

3) This test device realizes the accelerated corrosion of the OSBD in a corrosion chamber. This test device adopts a simple and reasonable alternating dry-wet accelerated corrosion method based on a spray system, which well simulates the service environment of the OSBD.

DETAILED DESCRIPTION

Figure 1:
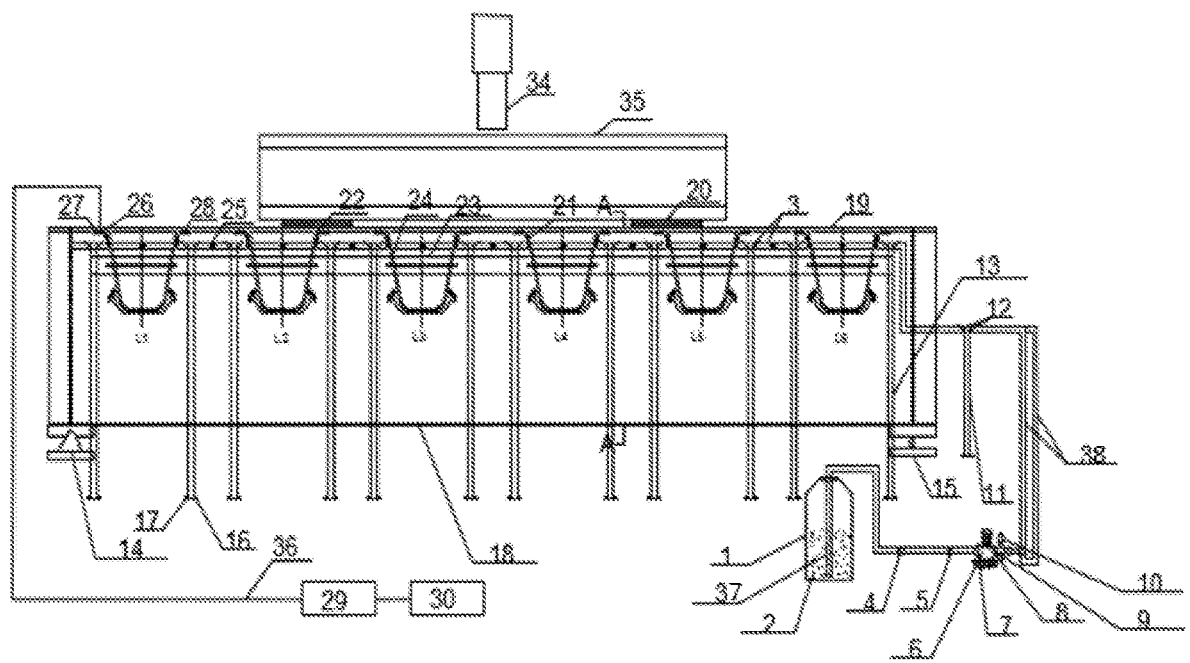
FIG. 1 is a structural diagram of the present invention.

The present invention is described in more detail below with reference to the accompanying drawings. Reference Numerals: 1. water tank; 2. sodium chloride solution; 3. first pipe; 4. check valve; 5. active joint; 6. pressure pump; 7. water inlet; 8. junction box; 9. pressure switch; 10. gas tank; 11, 13. delivery pipe support; 12. Y-opening; 14, 15. simple support; 16. connecting bolt; 17. steel plate; 18. lower flange; 19. cover plate; 20. rubber support; 21. U-rib; 22. filter paper; 23. wood board; 24. infrared (IR) lamp; 25. sprayer; 26. fiber Bragg grating (FBG) stress sensor; 27. FBG temperature sensor; 28. FBG chloride ion concentration sensor; 29. demodulator; 30. data acquisition and storage device; 31. diaphragm; 32, 33. pipe joint; 34. hydraulic jack; 35. test loading beam; 36. conductive optical fiber; L1. rib 1; L2. rib 2; L3. rib 3; L4. rib 4; L5. rib 5; L6. rib 6; 37. second pipe; and 38. third pipe.

Example 1

Referring to the accompanying drawings, the present invention provides a test method using a corrosion-fatigue-coupled test device for a steel bridge deck, including the following steps:

1) Install a full-scale model of a segmented orthotropic steel bridge deck (OSBD) in a fatigue laboratory, arrange a fiber Bragg grating (FBG) sensor, and paste filter paper: ship the OSBD to the laboratory after the manufacture of the OSBD in a factory, and fix the OSBD by a simple support; then arrange an FBG chloride ion concentration sensor at an equal distance of 2 mm within 30 cm of a weld seam to monitor the corrosion of the OSBD near the weld seam; determine a stress monitoring position by using a hot spot stress (HSS) extrapolation method, and arrange an FBG stress sensor and an FBG temperature sensor; apply an epoxy resin to prevent the sensor from being corroded; paste the filter paper in the range of the weld seam and the FBG stress sensor and the FBG temperature sensor, so that a uniform water film is formed on the OSBD during an accelerated corrosion process, which is close to an actual corrosion situation.

2) Establish a time-varying relationship of a corrosion-fatigue-coupled process: couple an alternating stress with a corrosion environment (which is close to an actual situation) to study a corrosion-fatigue life of the OSBD, where the corrosion and fatigue are coupled as follows: a: establish an equation log $P_{outside}$=log $P_{inside}$ according to a power function followed by the atmospheric exposure of Q345 steel, that is, log P=A+BlogT; b: take $A_{inside}$ and $B_{inside}$ derived from a laboratory test and $A_{outside}$ and $B_{outside}$ derived from an atmospheric exposure test into the established equation to calculate a corrosion acceleration ratio; and c. control a laboratory accelerated corrosion multiple to equal a laboratory fatigue loading multiple by controlling a fatigue loading frequency, after obtaining the laboratory corrosion acceleration ratio.

3) Install a sprayer corrosion device: prepare a 3.5% sodium chloride solution in a water tank connected to a pressure pump through a pipe; then install a pipe support, which is 5 cm away from a normal of the weld seam of the OSBD and 12 cm away below a center of the weld seam; weld a steel plate to a lower part of the pipe support, and fix the steel plate on the ground with a connecting bolt; connect a delivery pipe to the other end of the pressure pump, the delivery pipe being a polypropylene random (PPR) pipe with an outer diameter of 20 mm; make a small hole every 18 cm on a pipe parallel to a U-rib and a hole (corresponding to a center of the U-rib) on a pipe perpendicular to the U-rib to install a sprayer; connect the installed sodium chloride solution delivery pipe to the pressure pump; install an infrared (IR) lamp on a steel pipe on the top of the pipe support, and connect the IR lamp to a thermostat, so as to simulate actual sunlight to increase the temperature of the corrosion environment and accelerate the corrosion of the OSBD; protect the IR lamp with a transparent protective cover to avoid an influence of the corrosive solution.

4) Design a corrosion-fatigue-coupled test of the full-scale model of the segmented OSBD: perform alternating dry-wet immersion accelerated corrosion with 3.5% sodium chloride solution in the water tank; calculate the volume of corrosion yielded by the laboratory accelerated corrosion for 24 h, which is equivalent to the volume of corrosion caused by the outdoor atmospheric exposure for 56 d; couple the corrosion and fatigue according to the loading frequency; set an alternating dry-wet cycle to 1 h of spraying and 3 h of drying through a corrosion-fatigue-coupled calculation; use the IR lamp to control the temperature to 35° C. for spraying and 40° C. for drying. determine the fatigue loading frequency to be 3 HZ; conduct a static load test before fatigue loading to confirm that all components are normal; perform corrosion and fatigue loading simultaneously to achieve the coupling effect of corrosion and fatigue according to the determined corrosion time and loading frequency.

5) Acquire data of the corrosion-fatigue-coupled test of the full-scale model of the segmented OSBD: start the corrosion test and the fatigue loading test of the full-scale model of the segmented OSBD simultaneously according to the designed corrosion-fatigue-coupled test; record the number of stress cycles when a specimen is destroyed, and acquire and store the data of the sensor.

Example 2

Referring to the accompanying drawings, a device for implementing the test method described in Example 1 includes a hydraulic jack 34, a test loading beam 35, a rubber support 20, a delivery pipe support 13, a first pipe 3, an IR lamp 24, a water tank 1 and a pressure pump 6. The hydraulic jack 34 acts on the test loading beam 35. A rubber support 20 with an area of 200 mm×300 mm is placed between the test loading beam 35 and a test model to simulate a load of a single tire wheel transmitted through a paving. The delivery pipe support 13 is fixed on the ground parallel to a weld seam of the bridge model by a connecting bolt 16. The first pipe 3 is provided with a sprayer 25 and fixed to the delivery pipe support 13 by a clamp. A wood board 23 is bound to the delivery pipe support 13 below the first pipe 3. The wood board 23 is provided thereon with the IR lamp 24. A water tank 1 holding 3.5% sodium chloride solution 2 is placed in a lower right corner of the bridge deck model. The water tank 1 is connected to the pressure pump 6 through a second pipe 37. The right of the pressure pump 6 is divided into two third pipes 38 through a tee, which are connected to a joint 32 and a joint 33, respectively.

An OSBD is made of special Q345qD steel, and welded by a deck, a diaphragm and a U-rib. In the OSBD, a cover plate 19 is 14 mm thick, a lower flange 18 is 12 mm thick, the diaphragm 31 is 10 mm thick, the size of the U-rib 21 is 300 mm×280 mm×8 mm, and a center distance of the U-rib 21 is 600 mm. The bridge deck is fixedly installed in a fatigue laboratory by simple supports 14, 15. An FBG chloride ion concentration sensor 28 is arranged at an equal distance of 2 mm within 30 cm on both sides of the weld seam. The FBG stress sensor 26 is arranged at 5.6 mm, 14 mm and 20 mm from a weld toe at a welding position between the bridge deck and the U-rib by using a HSS extrapolation method. The FBG stress sensor 26 is arranged at 5 mm, 15 mm and 20 mm from a weld toe at a welding position between the bridge deck and the diaphragm. An FBG temperature sensor is connected in series with the FBG stress sensor for temperature compensation. The FBG stress sensor 26 is connected to a data acquisition and storage device 30 through a conductive fiber 36 and a demodulator.

The hydraulic jack 34 is a fatigue testing machine for test loading.

The OSBD is made of special Q345qD steel in a factory. The cover plate 19 of the OSBD is 14 mm thick, the lower flange 18 is 12 mm thick, the diaphragm 31 is 10 mm thick, the size of the U-rib 21 is 300 mm×280 mm×8 mm, and the center distance of the U-rib 21 is 600 mm. The bridge deck is fixedly installed in the fatigue laboratory by the simple supports 14, 15 to study corrosion fatigue performance.

The filter paper 22 is pasted on the weld seam of the OSBD and both sides thereof to form a uniform water film.

The monitoring sensor includes an FBG chloride ion concentration sensor 28, an FBG stress sensor 26 and an FBG temperature sensor 27. These sensors are used to monitor a chloride ion concentration, a stress and a temperature, respectively, and their positions are determined by using a HSS extrapolation method. Weld toe hot spots are divided into three categories: a-type hot spots are located at the root of a slave board and at a surface weld toe of a master board; b-type hot spots are located at an end weld toe at the edge of the slave board; c-type hot spots are located at a surface weld toe of the slave board along a weld seam. The structural stress distribution at the "a" and "c" type weld toes has a correlation with a component thickness t, and the position of an extrapolation point is determined according to the thickness t, or according to a reference point that is 0.4 t and 1.0 t or 0.5 t and 1.5 t away from the weld toes. The structural stress distribution at the "b" type weld toe does not depend on the component thickness t, and the position of the extrapolation point is determined by an absolute value or directly by a reference point that is 5 mm and 15 mm away from the weld toe. After the hot spot is determined, the sensor is attached to the OSBD. The FBG temperature sensor 27 is connected in series with the FBG stress sensor 26 for temperature compensation.

Figure 2:
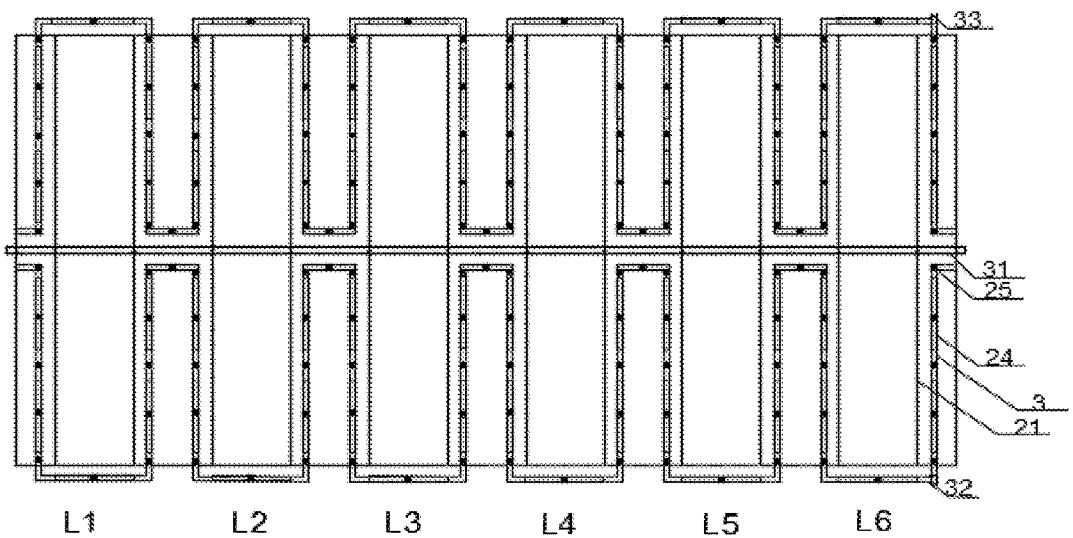
FIG. 2 shows an infrared lamp and a spray layout.

The wood board 23 is fixedly connected to the delivery pipe support 13 by binding. The IR lamp 24 is installed on the wood board 23 and connected to a thermostat to simulate the sun. The IR lamp is a 300 W long-wave IR (LWIR) lamp with a total length of 30 cm. The IR lamp features fast heating speed, uniform heating, small thermal inertia, no burst of cold and hot, energy conservation and long service life. The IR lamp takes only 1-3 min to realize the constant temperature of a component, and has as high as 60%-75% of energy conversion efficiency. Two IR lamps are arranged in parallel to the U-rib 21 on double sides of the diaphragm 31, and one IR lamp is arranged in parallel to the diaphragm 31, as shown in FIG. 2.

The first pipe 3 is a PPR pipe with an outer diameter of 20 mm, for delivering the sodium chloride solution 2.

The sprayer 25 is a square rotary sprayer, which is installed on the first pipe 3 to spray the corrosive solution. The sprayer allows the corrosive solution to adhere evenly to the OSBD.

Figure 3:
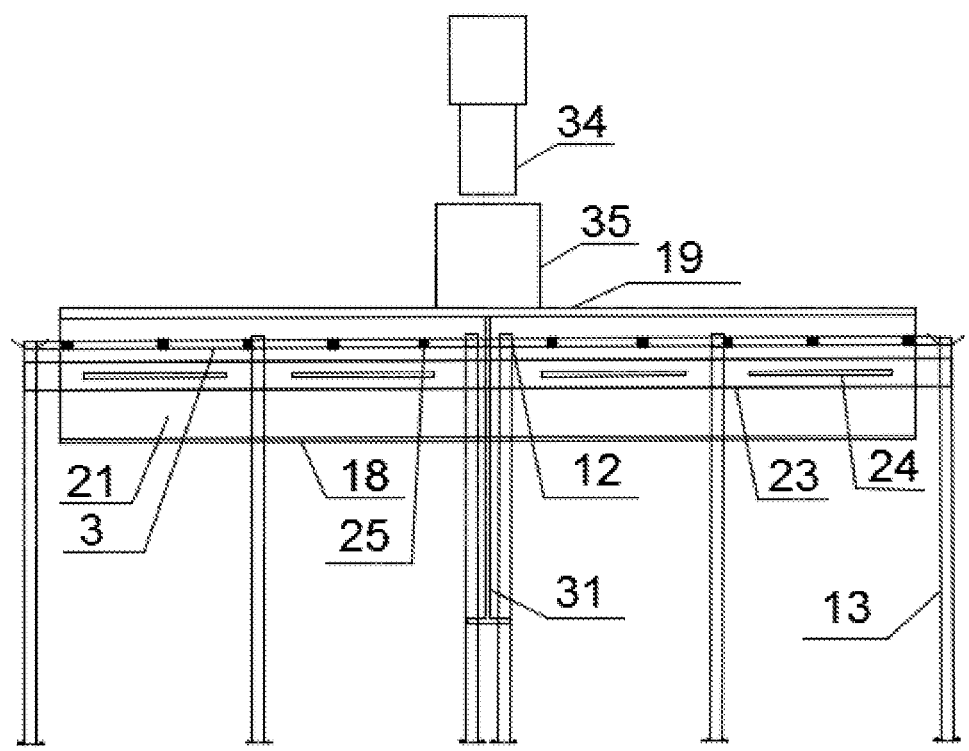
FIG. 3 is a sectional view taken along line A-A, showing the installation position and height of a sodium chloride solution delivery pipe and an infrared (IR) lamp.

The delivery pipe supports 11, 13 are used to support the first pipe 3 and install the IR lamp 24. They are 5 cm away from the normal of the weld seam of the OSBD and 12 cm away below the center of the weld seam; The delivery pipe support is a common fire pipe with an outer diameter of 25 mm, which is arranged along the weld seam (FIGS. 1 and 3). The lower part of the pipe support is welded with a steel plate 17, and the steel plate is fixed on the ground with a connecting bolt 16. The upper part of the pipe support is provided with a Y-opening 12 for placing the first pipe 3. A 6 cm wide and 1.5 cm thick wood board 23 is bound 3 cm below the Y-opening 12 along the weld seam to install the IR lamp 24. After the binding, the wood board is wrapped with a film to prevent it from being corroded by the sodium chloride solution 2.

The water tank 1 holds the sodium chloride solution. The pressure pump 6 pressurizes to deliver the salt solution into the sodium chloride solution delivery pipe. The sprayer sprays the salt solution to corrode the OSBD. Before the pressure pump 6 is started, the sodium chloride solution 2 is filled into the pump through the water inlet 7. When the pressure pump 6 is started, a check valve 4 is turned on to reduce the starting load of a motor. The pressure pump 6 is connected to a tee on the right. Two third pipes 38 are divided through the tee to realize the accelerated corrosion on double sides of the diaphragm 31. One pipe is connected to a first joint 32, and the other is connected to a second joint 33.

This corrosion-fatigue-coupled test device adopts a double-point loading method. A rubber support with an area of 200 mm×300 mm is placed between the test loading beam and the test model to simulate a load of a single tire wheel transmitted through a paving. The OSBD is supported by a simple support. The accelerated corrosion is alternating dry-wet immersion accelerated corrosion performed with 3.5% sodium chloride solution. The FBG sensors are used to monitor a variety of physical parameters, such as temperature, chloride ion concentration and stress.

Example 3

A full-scale test model of an OSBD made of Q345qD steel is used as a test object. In the OSBD, a cover plate is 14 mm thick, a lower flange is 12 mm thick, a diaphragm is 10 mm thick, the size of a U-rib is 300 mm×280 mm×8 mm, and a center distance of the U-rib is 600 mm. The design concept and the scheme of coupling corrosion and fatigue are described below.

1. Design and Implementation of Corrosion-Fatigue-Coupled Test Device (1) Design and Manufacture of Spray System The spray system includes a water tank, a pressure pump, a PPR water pipe with a diameter of 20 mm, a common fire pipe with a diameter of 25 mm for supporting the PPR pipe, and an intelligent control system (for controlling the time of spraying). After the position of the OSBD (described above) is determined, a water pipe support is installed. Two 20 mm×30 mm×2 mm thin steel plates (used to fix the PPR pipe) are welded on the upper part of the pipe support, and the lower part is fixed on the ground by a bolt. After the pipe support is installed, the water pipe is fixed to the pipe support with a clamp to prevent shaking due to the pressure of the pipe. Then one end of a pressure pump is connected to a water tank, and the other end is connected to the installed PPR pipe by a tee. The device is connected to a power supply to check whether it runs normally.

(2) Design of Corrosion-Fatigue-Coupled Test

The present invention performs alternating dry-wet immersion accelerated corrosion with 3.5% sodium chloride solution in the water tank. The volume of corrosion yielded by the laboratory accelerated corrosion for 24 h is equivalent to the volume of corrosion caused by the outdoor atmospheric exposure for 56 d. The corrosion and fatigue are coupled according to the loading frequency. An alternating dry-wet cycle is set to 1 h of spraying and 3 h of drying through a corrosion-fatigue-coupled calculation. The IR lamp is used to control the temperature to 35° C. for spraying and 40° C. for drying. The fatigue loading frequency is determined to be 3 HZ, and a static load test is conducted before fatigue loading to confirm that all components are normal. Corrosion and fatigue loading are performed simultaneously to achieve a coupling effect of corrosion and fatigue according to the determined corrosion time and loading frequency.

2. Implementation of FBG Sensor (1) FBG sensor: Ribs 2, 5 are selected for monitoring. A stress measurement point at a weld joint between each of the selected U-ribs and a bridge deck is 5.6 mm (0.4 t, t=14 mm), 14 mm (1 t) and 20 mm away from a weld seam. A stress measurement point at a weld joint between each of the selected U-ribs and a diaphragm is 5 mm, 15 mm and 20 mm away from a weld seam. A temperature compensation tactile sensor is arranged near each stress measurement point to eliminate a temperature-induced stress change during stress testing.

The content described in the examples of the specification is merely an enumeration of the implementations of the inventive concept, and the claimed scope of the present invention should not be construed as being limited to the specific forms stated in the examples. Equivalent technical means that come into the minds of those of skills in the art in accordance with the inventive concept also fall within the claimed scope of the present invention.

What is claimed is:

1. A corrosion-fatigue-coupled test method for a steel bridge deck, comprising:

1) installing a full-scale model of a segmented orthotropic steel bridge deck (OSBD) in a fatigue laboratory, arranging a fiber Bragg grating (FBG) sensor, and pasting a filter paper: shipping the segmented OSBD to the fatigue laboratory after the manufacture of the segmented OSBD in a factory to install, and fixing the segmented OSBD by a simple support; then arranging FBG stress sensor at an equal distance of 2 mm within 30 cm of a weld seam to monitor a corrosion of the segmented OSBD near the weld seam; determining a stress monitoring position by using a hot spot stress (HSS) extrapolation method, and arranging the FBG stress sensor and FBG temperature sensor; applying an epoxy resin to prevent the FBG stress sensor and the FBG temperature sensor from being corroded; pasting the filter paper in a range of the weld seam and the FBG stress sensor and the FBG temperature sensor, so that a uniform water film is formed on the segmented OSBD during an accelerated corrosion process, which is close to an actual corrosion situation;

2) establishing a time-varying relationship of a corrosion-fatigue-coupled process: coupling an alternating stress with a corrosion environment (which is close to an actual situation) to study a corrosion-fatigue life of the segmented OSBD, wherein the corrosion and fatigue are coupled as follows: a: establishing an equation log $P_{outside}$=log $P_{inside}$ according to a power function followed by the atmospheric exposure of Q345 steel, that is, log P=A+BlogT; b: taking $A_{inside}$ and $B_{inside}$ derived from a test in the fatigue laboratory and $A_{outside}$ and $B_{outside}$ derived from an atmospheric exposure test into the established equation to calculate a corrosion acceleration ratio; and c. controlling a laboratory accelerated corrosion multiple to equal a laboratory fatigue loading multiple by controlling a fatigue loading frequency, after obtaining the laboratory corrosion acceleration ratio; wherein, P is a corrosion depth of the Q345 steel, $P_{outside}$ is a corrosion depth of the atmospheric exposure test, $P_{inside}$ is a corrosion depth of the test in the fatigue laboratory, A is a logarithmic value of a corrosion depth of the Q345 steel in a first year, $A_{outside}$ is a logarithmic value of a corrosion depth of the atmospheric exposure test in the first year, $A_{inside}$ is a logarithmic value of a corrosion depth of the test in the fatigue laboratory in the first year, B is a coefficient representing a tendency of corrosion, $B_{outside}$ is a coefficient representing a tendency of corrosion in the atmospheric exposure test, B inside is a coefficient representing a tendency of corrosion of the test in the fatigue laboratory, T is a predetermined corrosion time;

3) installing a sprayer corrosion device: preparing a 3.5% sodium chloride solution in a water tank connected to a first end of a pressure pump through a pipe; then installing a pipe support, which is 5 cm away from a normal of the weld seam of the segmented OSBD and 12 cm away below a center of the weld seam; welding a steel plate to a lower part of the pipe support, and fixing the steel plate on a ground with a connecting bolt; connecting a delivery pipe to a second end of the pressure pump, the delivery pipe being a polypropylene random (PPR) pipe with an outer diameter of 20 mm; making a small hole every 18 cm on a pipe parallel to a U-rib and a hole (corresponding to a center of the U-rib) on a pipe perpendicular to the U-rib to install a sprayer; connecting the delivery pipe installed to the pressure pump; installing an infrared (IR) lamp on a steel pipe on the top of the pipe support, and connecting the IR lamp to a thermostat, so as to simulate actual sunlight to increase a temperature of the corrosion environment and accelerate the corrosion of the segmented OSBD; protecting the IR lamp with a transparent protective cover to avoid an influence of the 3.5% sodium chloride solution;

4) designing a corrosion-fatigue-coupled test of the full-scale model of the segmented OSBD: performing alternating dry-wet immersion accelerated corrosion with 3.5% sodium chloride solution in the water tank; calculating a volume of corrosion yielded by accelerated corrosion in the fatigue laboratory for 24 h, which is equivalent to a volume of corrosion caused by atmospheric exposure for 56 d in outdoor; coupling the corrosion and fatigue according to the fatigue loading frequency; setting an alternating dry-wet cycle to 1 h of spraying and 3 h of drying, through a corrosion-fatigue-coupled calculation; using the IR lamp to control the temperature to 35° C. for spraying and 40° C. for drying; determining the fatigue loading frequency to be 3 HZ, and conducting a static load test before fatigue loading to confirm that all components are normal; performing corrosion and fatigue loading simultaneously to achieve a coupling effect of corrosion and fatigue according to the predetermined corrosion time and the fatigue loading frequency; and 5) acquiring data of the corrosion-fatigue-coupled test of the full-scale model of the segmented OSBD: starting the corrosion test and a fatigue loading test of the full-scale model of the segmented OSBD simultaneously according to the corrosion-fatigue-coupled test designed; recording a number of stress cycles when a specimen is destroyed, and acquiring and storing the data of the sensor.

2. A device for implementing the corrosion-fatigue-coupled test method for a steel bridge deck according to claim 1, comprising a hydraulic jack (34), a test loading beam (35), a rubber support (20), a delivery pipe support (13), a first pipe (3), the IR lamp (24), the water tank (1) and the pressure pump (6), wherein the hydraulic jack (34) acts on the test loading beam (35); the rubber support (20) with an area of 200 mm×300 mm is placed between the test loading beam (35) and the full scale model of the segmented OSBD to simulate a load of a single tire wheel transmitted through a paving; the delivery pipe support (13) is fixed on the ground parallel to a weld seam of the full scale model of the segmented OSBD by the connecting bolt (16); the first pipe (3) is provided with the sprayer (25) and fixed to the delivery pipe support (13) by a clamp; a wood board (23) is bound on the delivery pipe support (13) below the first pipe (3); the wood board (23) is provided thereon with the IR lamp (24); the water tank (1) holding 3.5% sodium chloride solution (2) is placed in a lower right corner of the full scale model of the segmented OSBD; the water tank (1) is connected to the pressure pump (6) through a second pipe (37); a right of the pressure pump (6) is divided into two third pipes (38) through a tee, which are connected to a joint (32) and a joint (33), respectively;

the segmented OSBD is made of special Q345qD steel, and welded by a bridge deck, a diaphragm and a U-rib; in the segmented OSBD, a cover plate (19) is 14 mm thick, a lower flange (18) is 12 mm thick, the diaphragm (31) is 10 mm thick, a size of the U-rib (21) is 300 mm×280 mm×8 mm, and a center distance of the U-rib (21) is 600 mm; the bridge deck is fixedly installed in the fatigue laboratory by simple supports (14,15); the FBG stress sensor (26) is arranged at an equal distance of 2 mm within 30 cm on both sides of the weld seam; the FBG stress sensor (26) is arranged at 5.6 mm, 14 mm and 20 mm from a weld toe at a welding position between the bridge deck and the U-rib by using a HSS extrapolation method; the FBG stress sensor (26) is arranged at 5 mm, 15 mm and 20 mm from the weld toe at the welding position between the bridge deck and the diaphragm; the FBG temperature sensor is connected in series with the FBG stress sensor for temperature compensation; the FBG stress sensor (26) is connected to a data acquisition and storage device (30) through a conductive fiber (36) and a demodulator.

* * * * *